(No Model.)  3 Sheets—Sheet 1.
E. JORDAN.
METHOD OF MAKING BARBED FENCING.
No. 505,708. Patented Sept. 26, 1893.
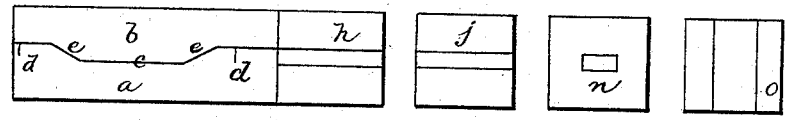
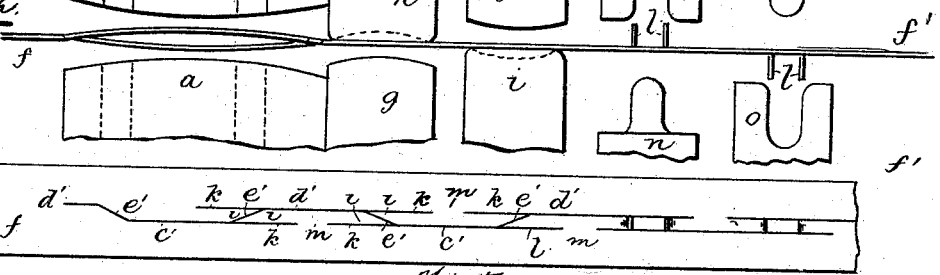
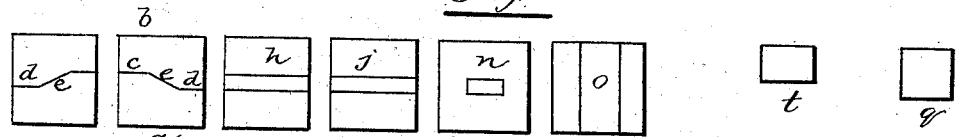
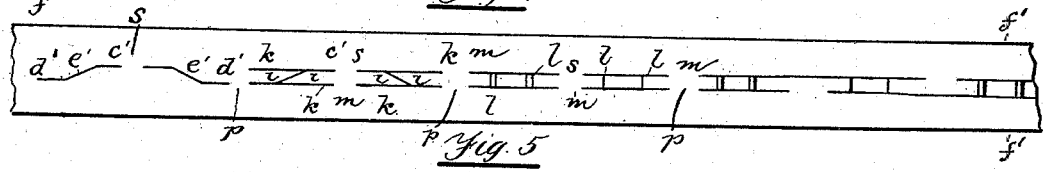
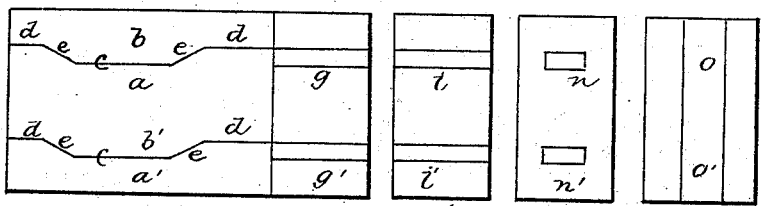
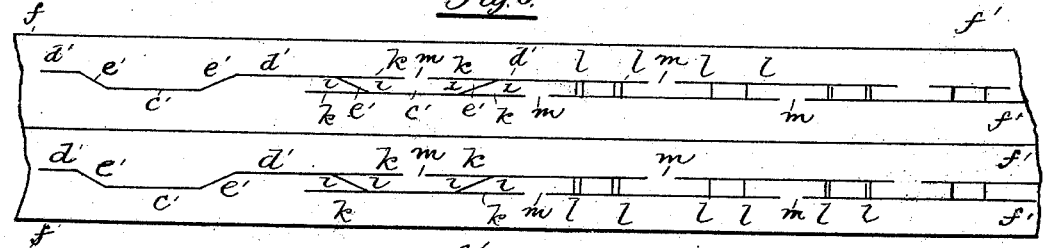
WITNESSES:
Wm A. Rosenbaum
H. J. Morgan
INVENTOR
Edmund Jordan
BY A. P. Thayer.
ATTORNEY (No Model.) 3 Sheets—Sheet 2.
E. JORDAN.
METHOD OF MAKING BARBED FENCING.
No. 505,708. Patented Sept. 26, 1893.
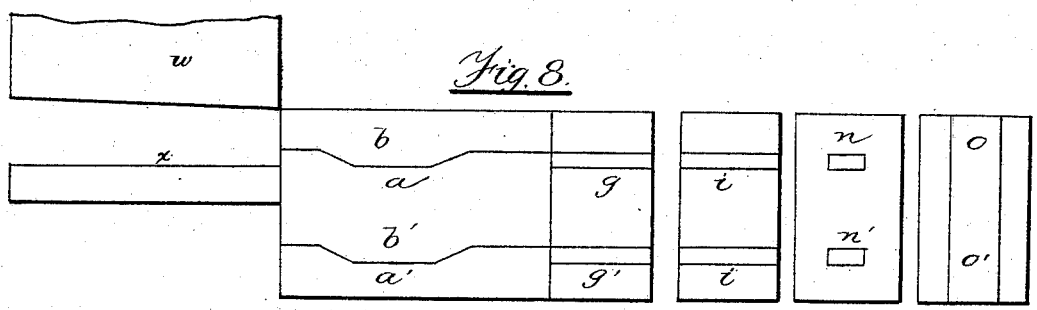
Fig. 8.
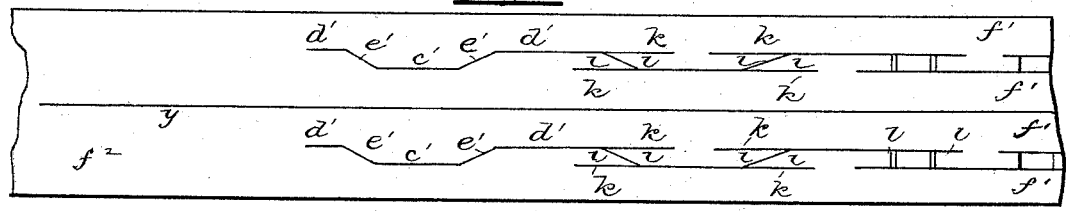
Fig. 9.
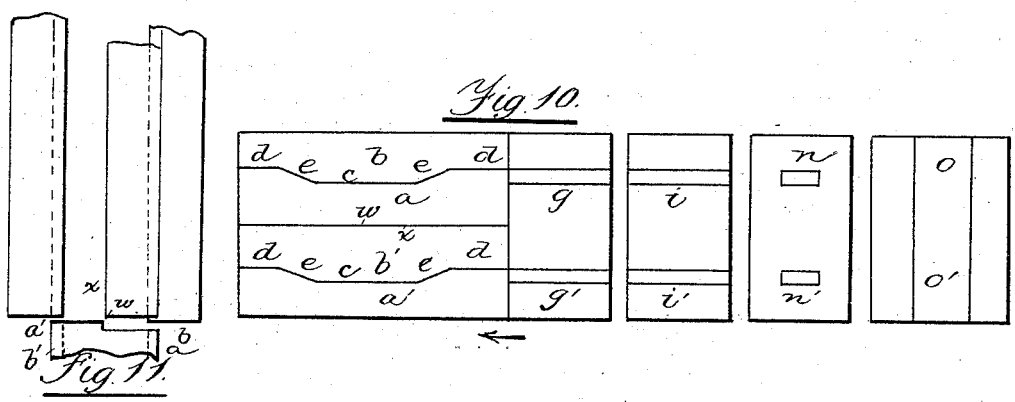
Fig. 10.
Fig. 11.
Fig. 12.
WITNESSES:
Wm. Rosenbaum
O. J. Morgan
INVENTOR
Edmund Jordan
BY A. P. Thayer.
ATTORNEY (No Model.) 3 Sheets—Sheet 3.
E. JORDAN.
METHOD OF MAKING BARBED FENCING.
No. 505,708. Patented Sept. 26, 1893.
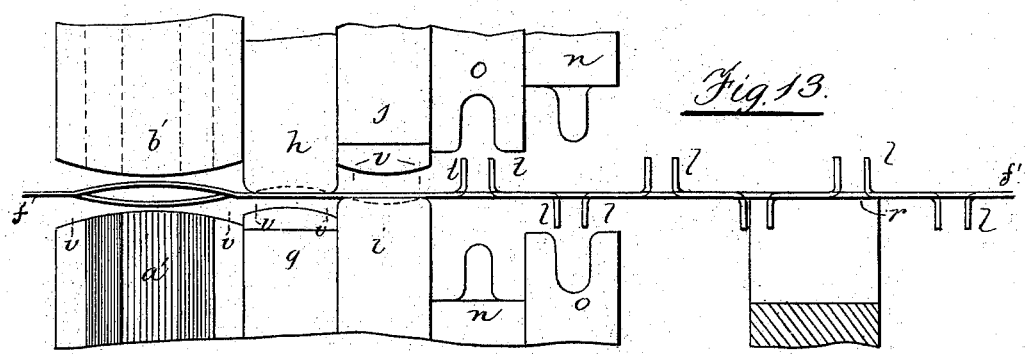
Fig. 13.
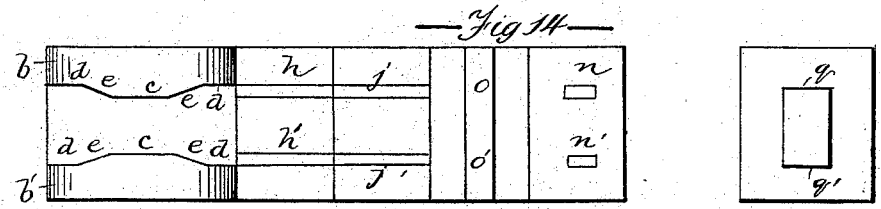
Fig. 14.
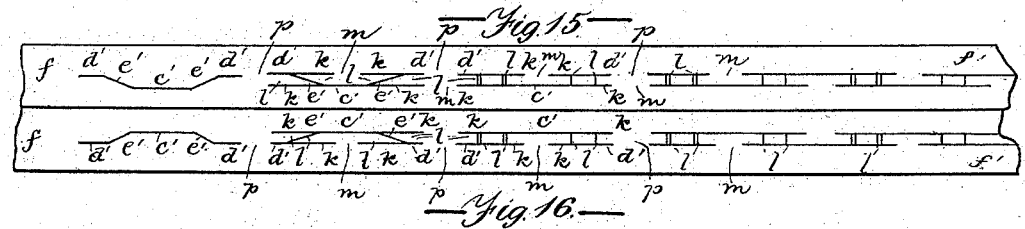
Fig. 15.
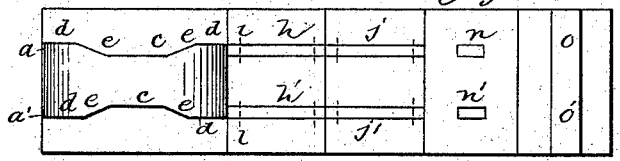 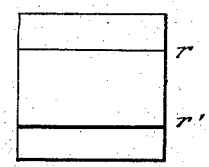
Fig. 16.
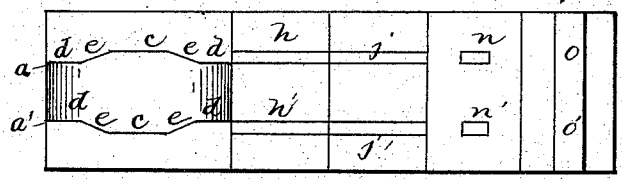
Fig. 17.
WITNESSES:
Wm. A. Rosenbaum
D. H. Morgan
INVENTOR
Edmund Jordan
BY A. P. Thayer
ATTORNEY

UNITED STATES PATENT OFFICE.

EDMUND JORDAN, OF BROOKLYN, ASSIGNOR, BY MESNE ASSIGNMENTS, TO THOMAS V. ALLIS, OF NEW YORK, N. Y.

METHOD OF MAKING BARBED FENCING.

SPECIFICATION forming part of Letters Patent No. 505,708, dated September 26, 1893.

Application filed June 8, 1888. Serial No. 276,518. (No specimens.)

*To all whom it may concern:*

Be it known that I, EDMUND JORDAN, a citizen of the United States, and a resident of Brooklyn, in the county of Kings and State of New York, have invented certain new and useful Improvements in Methods of Making Barbed Fencing, of which the following is a specification.

My invention consists of the method of producing two barbed strips from one double blank strip by making successive slits along the blank through the same at intervals, or in continuous connection, which slits are in two parallel lines, and diagonal lines extending from one to the other of said parallel lines, and making other slits in line with the parallel slits, which together with the former slits, when continuous, separate the barbed strips one from the other, and form barbs on each strip alternately, and when said former slits are made at intervals, similarly form the barbs and nearly separate the barbed strips, then bending the barbs laterally to the strips for the required projection, and, when only partly separated by the cutting of the barbs, completely, and by preference, finally separating the barbed strips by slitting the intervals of uncut webs apart, but this part of the separation may be done prior to the making of the other slits.

My invention also consists of simultaneously producing four barbed strips from two double blank strips of a quadruple blank strip by the same method of slitting the strip and forming the barbs, and by separating the quadruple strip, at the same time, when it is used, all as hereinafter fully described, and represented in the drawings which show various forms and arrangements of dies by which the improved method may be carried out.

Figure 1 represents face views of dies for slitting and bending as when the slitting dies make continuous slits. Fig. 2 is a side elevation of the same contrivance of dies with the blank strip between them. Fig. 3 is a diagram of the strips showing the action of the slitting and bending dies on it. Fig. 4 represents face views of dies for slitting, bending and finally separating, as when the slitting dies make interval slits. Fig. 5 is a diagram of the strip showing the action of the dies of Fig. 4 on it. Fig. 6 is a face view of dies showing a duplicate arrangement for producing four barbed strips from two double blank strips at the same time. Fig. 7 is a diagram of two double blank strips showing the action of dies such as represented in Fig. 6 on them. Fig. 8 is a face view of dies showing a duplicate arrangement of barbing dies and slitting dies for separating a quadruple strip and producing four barbed strips from it. Fig. 9 is a diagram of the quadruple blank showing the action of the dies of Fig. 8 on it. Fig. 10 is a face view of a duplicate arrangement of barbing dies, in which dies for slitting the quadruple strip are arranged between the slitting dies for producing the barbs. Fig. 11 is an elevation of part of the dies of Fig. 10, as seen looking in the direction of the arrow. Fig. 12, is a diagram of the quadruple strip showing the action of the dies of Fig. 10 on it. Fig. 13 is a side elevation, and Figs. 14 and 16, are face views of dies substantially like those of Fig. 1 but arranged for the partial separation of the double blank strip by interval slits, with other dies for effecting the final separation, and being in duplicate for producing four barbed strips, and the duplicates of the primary slitting dies being reversed as to each other in respect of the diagonal lines. Fig. 15 is a diagram of a couple of blank strips showing the action of the dies of Figs. 13, 14, and 16 on them. Fig. 17 is a face view of duplicate dies, making interval slits, and showing a modified arrangement of the dies for making the final separation of the double barbed strips.

I make a pair of shearing dies *a, b*, having the cutting edges *c*, along the middle portion, and *d*, near each end in different parallel planes, and diagonal edges *e*, connecting the ends of said parts *c, d*, respectively, the length of the whole of the cutting edge being a little greater than the desired distance from center to center between the pairs of barbs to be produced on the finished strips when the double blank strip is to be completely separated by these dies as in Figs. 1, 2, 6, 8, and 10, and the distance of the planes of the edges *c, d*, apart is that of the desired width of the barbs to be made, but when said dies *a, b*, are only to partially separate the double blank strip by making slits at intervals the length of the effective portions of the cutting edges will be somewhat less than said distance from center to center of the pair of barbs as represented in Figs. 4, 13, 14, 16, and 17. These dies make (preferably) the first operation in the process of producing two barbed strips $f'$, from a double blank strip $f$, though the order in which they are arranged with other following described dies may be so changed that their operation is later. They cut the slits $c'—d'$ and $e'$, through the strip $f$, corresponding with the shape of the dies as above set forth which slits separate or partly separate the two barb strips $f'$, and also cut the barbs $l$, along one edge and along the points; next following are male and female parallel edged barb cutting dies $g$, $h$, slitting through the strip in one direction, say upward, and similar dies $i, j$, slitting through in the opposite direction, which dies making the other slits $k$, in line with and in extension of the parallel slits across the diagonal slits separate the other uncut edges of the barbs $l$, from the strips so far as they are to be cut therefrom but leaving the uncut webs $m$, by which the barbs remain connected with the strips, two barbs (a pair) being connected by one web $m$, alternately on each strip $f'$. These two pairs of slitting dies, together, make four slits $k$, to one slit $c'\ d'$, and $e'$, and together therewith make four barbs to each of said slits, that is, two barbs on each barb strip and they partly bend the barbs into the required lateral projection which is perpendicular to the plane of the strip and alternately in opposite directions. After the operation of these second slitting dies the strip thus completely cut for the barbs proceeds to the two pairs of bending dies $n$, $o$, suitably placed in the train for bending two of the cut barbs one way and the other two reversely which completes the making of the barbs and the separation of the blank strip $f$, and the production of the two barbed strips $f'$ when the continuous slitting dies of Figs. 1, 2, 6, 8, and 10, are used but when the interval slitting dies such as represented in Fig. 4, 13, 14, and 16 are used the barbed strips $f'$, still remain united by the uncut webs $p$, which the cutters $q$, preferably following the benders are employed to separate, as the final act of the process but it is evident that these cutters may be arranged in advance of cutters $a$, $b$, to make short slits that will have the same effect as when made last. This device of an uncut web uniting the barbed strips until the bending of the barbs takes place is a more effectual means of preventing the separating of the strips under the action of the benders than the guides of the feed way alone can be, and it enables the strip to feed with less friction. There is also a tendency of the slitted portion of the strip to spread under the action of the slitting dies $g$, $h$, and $i, j$, which may be prevented by making the dies $a$, $b$, with a division at the middle as represented in Fig. 4 to leave an uncut web $s$, Fig. 5, in which case other cutters will be provided, and preferably located after the benders, to part said webs also. It will be seen in Fig. 4 that one division of the dies $a$, $b$, together with one pair of parallel edged dies as $g$, $h$, will with the web cutters $q$, and $t$, produce two barbed strips from one blank by the same method of slitting as both of said divisions and the two pairs of parallel edged dies do, but accomplishing only half the amount of work in a given time, which is alike included in my invention. The dies $a$, $b$, have convex faces as in Figs. 2 and 13, and are gaged in respect of their closing so as not to cut quite their whole length as indicated by the dotted lines $v$, Fig. 13 and the dies $g$, $h$, and $i, j$, are similarly arranged both for limiting the length of the slits as desired and also for graduating the action on the metal to prevent distortion and cracking at the ends of the slits.

The slitting, bending and also the separating dies, when used, are duplicated, at $a'—b'$; $g'—h'$; $i'—j'$; $n'—o'$; $q'$ and $r'$; for converting two double blank strips $f$, Figs. 7 and 15, or a quadruple blank strip $f^2$, Figs. 9 and 12 into four barbed strips at once, the duplicates being located side by side a suitable distance apart for so cutting the two double, or one quadruple blank, as will produce said four barbed strips in the proper width, and when the quadruple blank strip is to be used, a pair of slitting cutters $w$, $x$, is employed to separate the quadruple blank along line $y$, which slitting dies may be arranged in advance of the rest as in Fig. 8, or in succession of them, or they may be located between the duplicate slitting dies $a$, $b$, and $a'$, $b'$, as represented in Figs. 10, and 11.

The duplicate slitting dies $a—b$, and $a'\ b'$, may be arranged with the oblique lines $e$, in the same direction as in Figs. 6, 8, and 10, which is the preferable way because it results in a better relation of the barbed edges of the strip for splicing before twisting than otherwise, but said duplicates may be arranged with the oblique lines convergent as in Figs. 14 and 16, or divergent as in Fig. 17. In the latter case the uncut webs $p$, to be finally separated by the dies $q$, $r$, and $q'$, $r'$, will range with the inner lines $k$, and the dies therefor will be correspondingly closer together as in Fig. 17 wherein the dotted lines $q$, $q'$ represent two cutters and the full lines a double edged cutter suitably arranged for the purpose.

Suitable guides will be employed to prevent the cut portions of the blank from spreading under the influence of the dies, but they need not be represented herein as the apparatus is reserved for a separate application for a patent.

In the patent granted to me July 22, 1884, No. 302,534, I have represented a method of producing barbed strips with integral barbs at greater distance apart than the length of the barbs and without waste of material which consists in first, separating the blank strip along the middle portion into two strips each having projecting ribs and notches alternately along the edge separated from the other part; second, after such separation of the two parts, separating said ribs a portion of their length along the strip, and third, bending said partly separated ribs outward edgewise in the plane of the strips and thus producing projecting barbs so that by taking the material for the barbs of each strip from the notches between the material for the barbs of the other strip, and producing the length of the barbs from the lengthwise direction of the strip and bending them outward for their projection, barbs of the desired length and distance apart can be produced without such waste of material as when the barbs are cut so as to project in the manner of saw teeth as was the prior practice in producing two barbs from a blank strip. In my present improvement in which substantially the same plan for economizing material is observed I overcome four important objections to that method, viz: first, the separate operation necessary in slitting the strip apart; second, the separate operation for slitting the barbs preparatory to bending them; third, the separate operation necessary for bending the barbs outwardly in the plane of the strip, and fourth, the greater difficulty and expense of so bending said barbs than of bending them laterally, which are obvious in that case, especially the bending of the barbs which so far as my knowledge and experience go, it is impossible to accomplish in that manner either while slitting the strip in the first place, or while slitting the barbs along the strip, whereas in the improved method which I now present the slitting of the barbs while slitting the strip is not only feasible, but that operation also accomplishes part of the bending of the barbs, and the completion of the bending is alike feasible during the slitting so that in the present improvement these economies are added to that of the economy of material in the prior invention and now this form of fencing most acceptable of all in the art is produced in still better form, in that the lateral bend of the barbs is better than the other and much cheaper. The barbs bent laterally are better because the metal is not strained and cracked as much, and the lateral bending admits of the barbs being bent in opposite directions alternately which distributes the barbs in greater measure radially when the strips are twisted.

What I claim, and desire to secure by Letters Patent, is—

1. The improvement in the art of producing two barbed strips having integral barbs projecting from one edge from a blank strip which consists in successively making slits along the strip lengthwise partly in two parallel lines and partly in diagonal lines joining said parallel lines as $d'\ e'\ c'\ e'\ d'$, and successively thereto making other slits as $k'$ in prolongation of lines $c'\ d'$ across lines $e'$ of said first mentioned slits and extending from said lines $e'$ the length of a barb less the web $m$ joining the barb and strip, and successively bending the barbs so cut laterally to the strips substantially as described.

2. The improvement in the art of producing four barbed strips having integral barbs projecting from one edge from a blank strip, which consists in successively making two lines of slits along the strip lengthwise, said slits being partly in two parallel lines and partly in diagonal lines joining said parallel lines as $d'\ d'\ c'\ e'\ d'$, and successively thereto making other slits as $k$ in prolongation of lines $c'\ d'$ across lines $e'$ of said first mentioned slits and extending from said lines $e'$ the length of a barb less the web $m$ joining the barb and strip, successively bending the barbs so cut laterally to the strip, and slitting said blank strip apart along the middle substantially as described.

Signed at New York city, in the county and State of New York, this 7th day of May, A. D. 1888.

EDMUND JORDAN.

Witnesses:
 W. J. MORGAN,
 GEO. T. JAMISON.

It is hereby certified that in Letters Patent No. 505,708, granted September 26, 1893, upon the application of Edmund Jordan, of Brooklyn, New York, for an improvement in "Methods of Making Barbed Fencing," errors appear in the printed specification requiring correction as follows: In line 82, page 3, the reference letters "$d'\ d'\ c'\ e'\ d'$" should read $d'\ e'\ c'\ e'\ d'$, and line 83, same page, reference letter "$k$" should read $k'$; and that the Letters Patent should be read with these corrections therein, that the same may conform to the record of the case in the Patent Office.

Signed, countersigned, and sealed this 17th day of October, A. D. 1893.

[SEAL]

WM. H. SIMS,
*First Assistant Secretary of the Interior.*

Countersigned:
  JOHN S. SEYMOUR,
    *Commissioner of Patents.*